United States Patent
Heim (10) Patent No.: US 9,958,953 B2
(45) Date of Patent: May 1, 2018

(54) HUMAN INTERFACE DEVICE AND METHOD

(71) Applicant: Microchip Technology Germany GmbH, Rosenheim (DE)

(72) Inventor: Axel Heim, Munich (DE)

(73) Assignee: MICROCHIP TECHNOLOGY GERMANY GMBH, Rosenheim (DE)

( * ) Notice: Subject to any disclaimer, the term of this patent is extended or adjusted under 35 U.S.C. 154(b) by 0 days. days.

(21) Appl. No.: 15/489,326

(22) Filed: Apr. 17, 2017

(65) Prior Publication Data

US 2017/0220124 A1    Aug. 3, 2017

Related U.S. Application Data

(63) Continuation of application No. 14/328,265, filed on Jul. 10, 2014, now Pat. No. 9,625,997.

(60) Provisional application No. 61/856,531, filed on Jul. 19, 2013.

(51) Int. Cl.
  *G06F 3/01* (2006.01)
  *G06F 3/044* (2006.01)
  *G06F 3/045* (2006.01)

(52) U.S. Cl.
  CPC ............. *G06F 3/017* (2013.01); *G06F 3/044* (2013.01); *G06F 3/045* (2013.01)

(58) Field of Classification Search
  CPC ................. G06F 3/017; G06F 3/044; G06F 2203/04108; G06F 2203/04101
  See application file for complete search history.

(56) References Cited

U.S. PATENT DOCUMENTS

| | | | |
|---|---|---|---|
| 6,944,315 B1 | 9/2005 | Zipperer et al. | 382/103 |
| 7,705,834 B2 | 4/2010 | Swedin | 345/174 |
| 7,813,527 B2 | 10/2010 | Wang | 382/103 |
| 8,531,431 B2 | 9/2013 | Swedin | 345/174 |
| 9,625,997 B2 | 4/2017 | Heim | |
| 2005/0257174 A1 | 11/2005 | Wilson | 715/863 |
| 2011/0041100 A1 | 2/2011 | Boillot | 715/863 |
| 2011/0205175 A1 | 8/2011 | Chen | 345/173 |
| 2013/0141375 A1 | 6/2013 | Ludwig et al. | 345/173 |
| 2014/0050354 A1 | 2/2014 | Heim et al. | 382/103 |

FOREIGN PATENT DOCUMENTS

| | | | | |
|---|---|---|---|---|
| DE | 102010007455 A1 | 8/2011 | ............. | G06F 3/00 |
| EP | 2104023 A2 | 9/2009 | ............. | G06F 3/041 |
| TW | 328201 B | 8/2010 | ............. | G06T 7/20 |
| WO | 2009/026337 A1 | 2/2009 | ............. | G06F 17/28 |
| WO | 2011/098496 A1 | 8/2011 | ............. | G06F 3/01 |

OTHER PUBLICATIONS

International Search Report and Written Opinion, Application No. PCT/US2014/046789, 10 pages, dated Nov. 11, 2014.
Taiwan Office Action, Application No. 103124827, 23 pages, dated Dec. 6, 2017.

*Primary Examiner* — Gustavo Polo
(74) *Attorney, Agent, or Firm* — Slayden Grubert Beard PLLC (57) ABSTRACT

A method for state tracking based gesture recognition engine for a sensor system has the steps of: defining a plurality of sequential states of a finite-state machine, determining a Sequence Progress Level (SPL) for each state, mapping a state probability distribution to a (single) SPL on run-time, and utilizing the mapped SPL estimate as an output value of the sensor system.

29 Claims, 5 Drawing Sheets

HUMAN INTERFACE DEVICE AND METHOD

CROSS-REFERENCE TO RELATED APPLICATIONS

This application is a continuation of U.S. application Ser. No. 14/328,265 filed on Jul. 10, 2014, which claims the benefit of U.S. Provisional Application No. 61/856,531 filed on Jul. 19, 2013, which is incorporated herein in its entirety.

TECHNICAL FIELD

The present disclosure relates to a method and device for a human interface, in particular to State Tracking in an HMM-based Gesture Recognition Engine for a Sensor System.

BACKGROUND

Known systems for multi-level control, e.g. volume control or screen/light brightness control in consumer electronics products, often use circular touch-pads or capacitive linear sliders (frequently mounted above the keyboard in notebooks), or they are using the touch information from a generic notebook touchpad when the finger is moving in a dedicated slider area on the right border of the touchpad.

These sensors provide absolute position information about the finger tip, and hence the finger tip's angle on the circular touchpad or the position on the slider—information that can be mapped directly or differentially to a control level in a straight forward way.

In particular for the touch wheel it is important that the fingertip and the wheel's geometric center build an angle with a reference point on the wheel, and this angle can be evaluated.

When it comes to the recognition of circle gestures without a fix geometric center position, determining an angle in the circle movement is no longer straight forward. This is the case, for example, for a generic non-circular touchpad, with 2D/3D free-air gestures using near-field capacitive sensor systems, or with mid/far field sensor systems like video or infrared camera systems.

Consider a circle movement which can either be clockwise or counter-clockwise, and we do not limit it to have a fix start or stop position. At each time during the circle movement, for real-time application we can only evaluate data acquired up to the presence, i.e. only partial gesture patterns. Without knowing the drawn circle's center, in the beginning of the movement the detection unit cannot tell the direction of the circle: For example, a left-right movement appears in the top of a clockwise circle but also in the bottom of a counter-clockwise circle.

SUMMARY

According to an embodiment, a method for state tracking based gesture recognition engine for a sensor system comprises the steps of: defining a plurality of sequential states of a finite-state machine, determining a Sequence Progress Level (SPL) for each state, mapping a state probability distribution to a (single) SPL on run-time, and utilizing the mapped SPL estimate as an output value of the sensor system.

According to a further embodiment, a last state can be followed by a first state of the plurality of sequential states. According to a further embodiment, the sensor system can be a three-dimensional (3-D) sensing system. According to a further embodiment, the 3-D sensor system can be a near-field capacitive sensor systems or a mid/far field sensor system. According to a further embodiment, the mid/far field sensor system may use a video or infrared camera system. According to a further embodiment, the near-field capacitive sensor system can be a capacitive non-touching 3-D sensor system based on a quasi static electric field measurements. According to a further embodiment, the sensor system can be a two-dimensional (2-D) sensing system, a capacitive or resistive touch system or a touchscreen system. According to a further embodiment, the sensor system can be a one-dimensional (1-D) sensing system. According to a further embodiment, the plurality of states can be states of a circular gesture. According to a further embodiment, the finite state machine can be a first order Markov Model. According to a further embodiment, a most likely state can be computed using a Forward (Baum-Welch) Algorithm. According to a further embodiment, a most likely state and/or a most likely state sequence can be computed using a Viterbi Algorithm. According to a further embodiment, the method uses an N-state Hidden Markov Model (HMM) comprising a state transition probability matrix. According to a further embodiment, the state transition probability matrix may comprise in each row a maximum probability value. According to a further embodiment, all probabilities of each row may add up to 100%. According to a further embodiment, the HMM further may use an observation matrix which indicates the probability of predefined movement directions. According to a further embodiment, the observation matrix may comprise in each row a maximum probability value. According to a further embodiment, all probabilities of each row may add up to 100%. According to a further embodiment, for each discrete-time instance the data provided by the sensor system can be forwarded to the finite state machine which computes a state probability distribution for the N-state HMM. According to a further embodiment, for each discrete-time instance, a state with the maximum probability can be selected and an SPL associated with the state is output. According to a further embodiment, for each time instance an SPL can be computed from the state probability distribution and is output. According to a further embodiment, the method may distinguish between a clock-wise circular gesture, a counter-clockwise circular gesture, or a no-movement gesture. According to a further embodiment, a Maximum Likelihood rule can be applied to compute the most likely state. According to a further embodiment, for a plurality of sequential output values a smoothening algorithm can be applied during post processing of sequential output values.

According to another embodiment, a method for gesture recognition may comprise a method as described above, and further comprise a pattern based gesture recognition mode, wherein the method switches between the pattern based gesture recognition mode and a state tracking based gesture recognition mode provided by the state tracking based gesture recognition engine when a predefined condition is met.

According to a further embodiment of such a method, the state tracking based gesture recognition mode may use an N-state Hidden Markov Model (HMM) comprising a probability matrix. According to a further embodiment of such a method, each state can be assigned to an observation probability distribution. According to a further embodiment of such a method, during the state tracking based gesture recognition mode for each discrete-time instance the data provided by the sensor system can be pre-processed and forwarded to the finite state machine which computes a state probability distribution for each state of the N-state HMM.

According to a further embodiment of such a method, for each discrete-time instance, a state with the maximum probability can be selected and an SPL associated with the state is output. According to a further embodiment of such a method, for each time instance a SPL can be computed from the state probability distribution and is output. According to a further embodiment of such a method, the state tracking based gesture recognition mode may distinguish between a clock-wise circular gesture, a counter-clockwise circular gesture, or a no-movement gesture. According to a further embodiment of such a method, the method may switch back to the pattern based gesture recognition mode if a predefined time threshold for a no-movement gesture is met. According to a further embodiment of such a method, a Maximum Likelihood rule can be applied to compute the most likely state. According to a further embodiment of such a method, for a plurality of sequential output values a smoothening algorithm can be applied during post processing of sequential output values. According to a further embodiment of such a method, the output value can be used to control a function of the device. According to a further embodiment of such a method, the function can be increasing or decreasing a volume level, controlling a dimmer, or controlling a scroll function.

DETAILED DESCRIPTION

Hence, part of the proposed solution is to identify the gesture (or pattern) which is observed. In the proposed method, this is done by comparison with a set of other possible gestures (which may include a garbage gesture representing random movement) using a probability measure. Once the most probable gesture is identified—for example after drawing a half circle—the progress of the gesture is tracked. (This progress tracking can also start right at the (detected) start of the gesture. Also, the progress of less likely gestures may be tracked simultaneously for different purposes, too.)

According to various embodiments, a method can be provided to a) a priori define or determine a Sequence Progress Level (SPL) for each state of a finite-state machine, b) to map the state probability distribution to a (single) SPL on run-time, and c) to utilize this SPL estimate as an information source (use-cases).

With the proposed method for tracking the gesture progress, not even a fixed reference position is needed. Our method is applicable—but not limited to—all of the aforementioned sensor systems and will be further explained in the following example.

Figure 1:
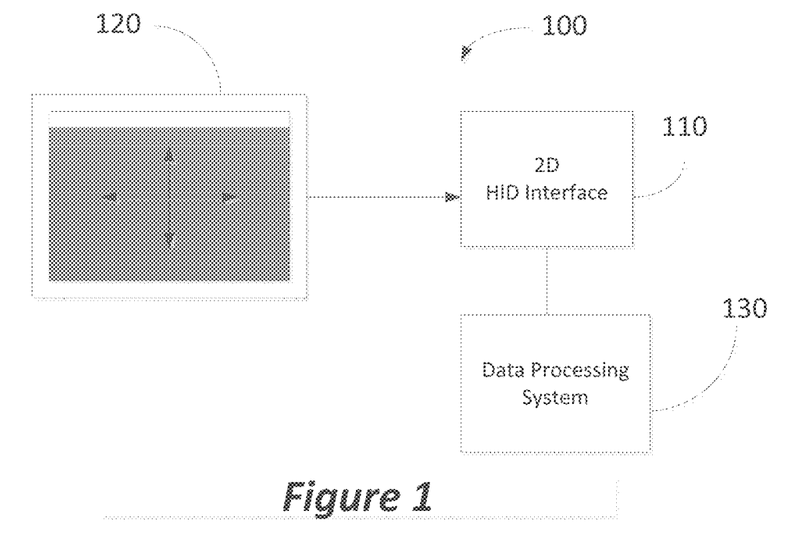
FIG. 1 shows a 2-D gesture recognition system according to an embodiment.

FIG. 1 shows for example a typical two-dimensional (2-D) detection system 100. The 2-D sensor 120 can be for example a capacitive or resistive trackpad or touchscreen detector which is coupled with a 2-D interface 110 configured to decode the raw information provided by sensor 120 and generate respective data and/or commands provided to a data processing system 130 coupled with the 2-D interface 110.

Figure 2:
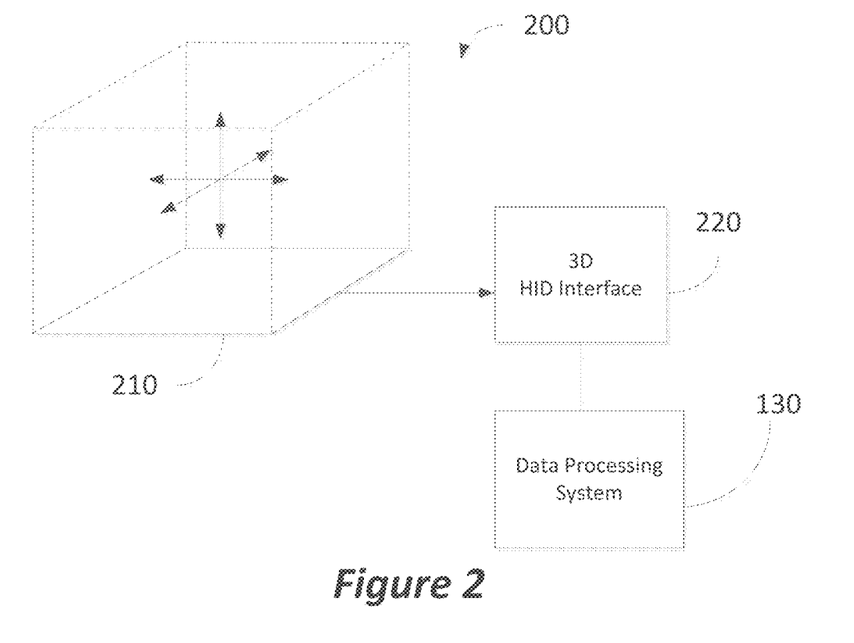
FIG. 2 shows a 3-D gesture recognition system according to an embodiment.
Figure 3:
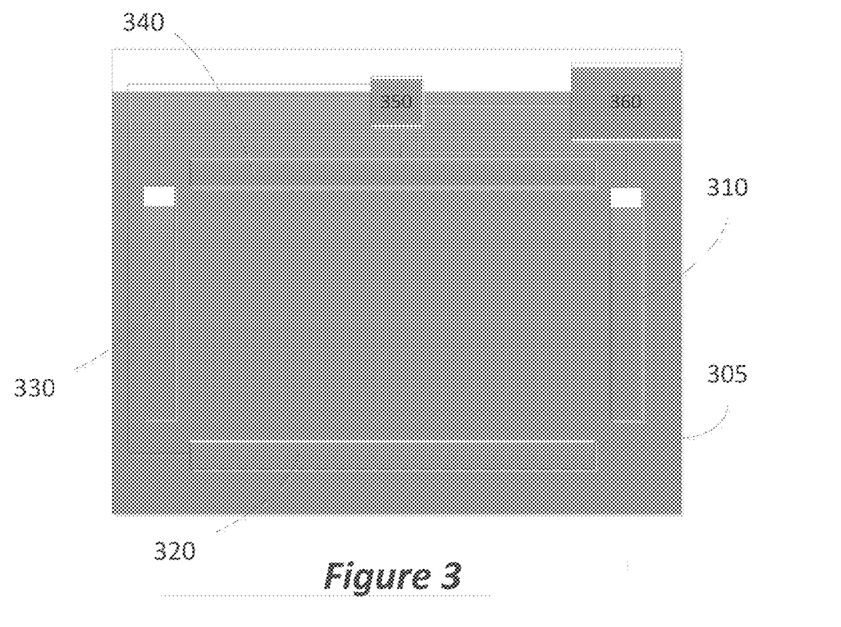
FIG. 3 shows an exemplary embodiment of a gesture detection system based on alternating electrical near-field evaluation using a plurality of receiving electrodes.
Figure 4:
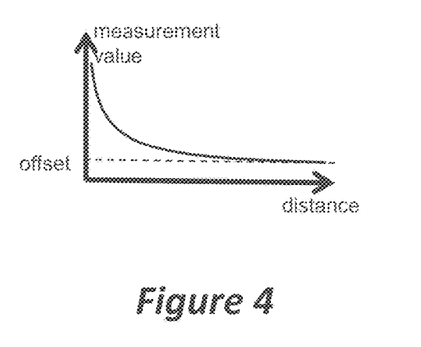
FIG. 4 shows typical output signals of a receiving sensor with respect to distance of an object.
Figure 5:
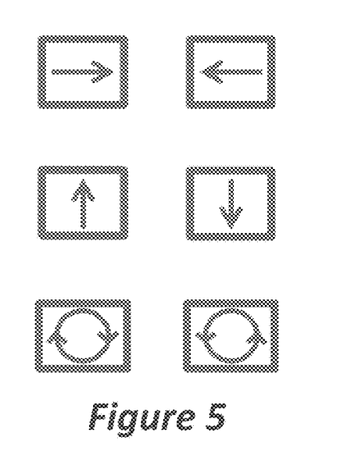
FIG. 5 shows a plurality of gestures that can be detected by a system according to FIGS. 1-3.

FIG. 2 shows an exemplary three-dimensional detection system 200. This system may use a quasi-static electric field detection system 210 with a plurality of electrodes coupled with a 3-D evaluation circuit 220, for example an integrated circuit device MGC3130 manufactured by Applicant which can be coupled with a data processing system 130. FIG. 3 shows an exemplary electrode arrangement usable for such a system comprising a plurality of receiving electrodes 310-340 arranged on a printed circuit board (PCB) 305. The PCB also provides for a transmitting electrode which is usually arranged on a lower layer of the PCB, e.g. on the bottom side of the PCB 305 for generating the quasi-static electric field. Such a system may generate an electric field, for example by using a 100 kHz alternating signal, e.g. a rectangular pulse train, fed to the transmitting electrode, which extends in area space above the receiving electrodes 310-340. A non-touch gesture made within the detection space causes disturbance of the field which can be detected by the receiving electrodes 310-340 arranged around and/or above the transmitting electrode or by measuring the loading of the transmitting electrode. Such a circuit board can at the same time include the evaluation chip 350 and provide for example a USB interface 360 for a data processing system. Objects entering the electric field disturb the same, wherein the signals at the various electrodes 310-340 are attenuated differently depending—among others—on the distance to the object. Thus, processing of the raw data provided by the electrodes 310-340 provides for the actual 3-D data. It may be inherent in such an electric field 3-D detection system that the larger the distance of the object to a respective electrode 310-340, the smaller the measurement value as shown in FIG. 4. However, the present application is not restricted to such behavior and an electric field system may provide for a different signal response. Gestures can be detected using a Hidden-Markov-Model (HMM) based Gesture Recognition system. The models are referred to as 'Hidden' because their true/actual state cannot be observed directly. 'Preferred' directions of movement for each state are connected to it via observation probabilities. The recognition of discrete gesture events, e.g. flicks and circles as shown in FIG. 5 is disclosed in co-pending US patent application publication US2014/0050354, titled "AUTOMATIC GESTURE RECOGNITION FOR A SENSOR SYSTEM" which is hereby incorporated by reference in its entirety.

The sensor system can, for example, be a capacitive sensor system with sensor electrodes whose measurement values are a monotonic measure for the distance between a electrically conductive object and the electrode. The features used for gesture recognition can, for example, be the signs of the 2-dimensional direction vector representing a finger's movement in a 2-dimensional (x,y) plane which is computed from the sensor measurement values. As explained above, the 3-D system can be any detection system such as optical, acoustic, etc. Again, a data processing system may receive the processed information from a 2-D system or a 3-D interface as shown, for example, in FIGS. 1 and 2.

The proposed method can also be applied to one-dimensional (1-D) sensor systems, for example touch or touch-less slider functions, that do not require a second dimension. In the following most examples refer to a circular gesture, such as a clockwise or counter-clockwise circle gesture. However, as mentioned within this application, the proposed method can also be applied to 1-D, 2-D, or 3-D sensing systems.

Example: Continuous Circle Gesture Phase Tracking ('AirWheel')

Assume we are provided with a Hidden Markov Model (HMM) based gesture recognition system, including the 4-state circular HMM defined in Table 1, where matrix A is the HMM's state transition probability matrix (current state in rows, next state in columns), matrix B is the observation probability matrix (state in rows, observation in columns), and π is the initial state probability vector. The columns of B correspond to the direction vectors in FIG. 7, in the same order as indicated on top of matrix B. The HMM represents a counter-clockwise circle gesture.

Figure 6:
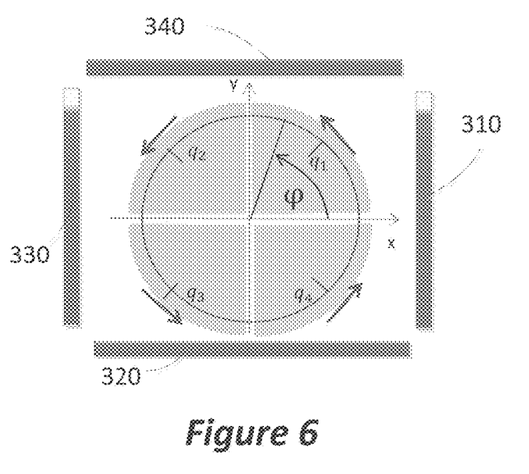
FIG. 6 shows a counter-clockwise circular gesture with respect to sensor electrodes of a system according to FIG. 3.
Figure 7:
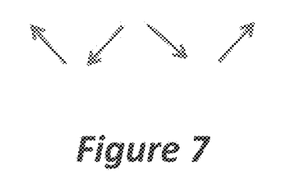
FIG. 7 shows a set of direction vectors as they also appear in the movement of the gesture according to FIG. 6.
Figure 8:
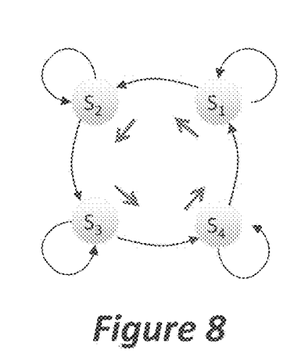
FIGS. 8-10 show various state diagrams.

FIG. 6 shows the association of all possible feature vectors with respect to HMM states with a system using the electric field 3-D sensors as shown in FIG. 3 with four receiving electrodes 310-340. The observation space is the set of the four direction vectors, which are extracted from the measurement data provided by the four receiving electrodes 310-340 which provide for tracking the movement of a hand in front of it. FIG. 7 shows the observation space with a set of four direction vectors. FIG. 8 shows the HMM's state diagram. With probability matrix B we see that the first state 's1' has a high probability B[1,1]=0.95 to output the direction vector to the top left, and a very small probability B[1,4]=0.02 to produce the vector to the top right.

As shown in FIGS. 6 and 8, for detection of a counter-clockwise circular gesture, the matrix B (See Table 1) is designed to have a maximum associated with the respective direction vector. Matrix A is designed to reflect the states and possible transitions for a respective gesture. Thus, for example, for state s1, there exists no transition to states s3 and s4 for the counter-clockwise gesture. The only non-zero transition probabilities are from state s1 to itself or to s2. Preferably, the probabilities in matrix A and B of each row add up to 100%. Due to the circularity of the gesture, the current state in matrix B, for example $s_1$, is bordered by a previous state $s_4$ and a next state $s_2$. Each state is associated with a dominant, i.e. a highly probable observation (distinct maximum in the row of B associated to this state), or a set of similar observations with high probabilities. For example, throughout the rows of B in Table 1, i.e. for each state, the probability to produce a direction vector with opposite direction than its most likely direction vector is smallest, e.g. the probability to produce a top right movement when in state s2 is smallest, where s2's most likely observation is down left. Table 1, merely shows an example of how probabilities can be assigned. Other values and maximum probabilities apply depending on the respective gesture and its characteristics. For example, a gesture and its associated HMM may not be circular and have a distinct beginning and an end. The gestures can vary and do not have to be circular.

TABLE 1

$$A = \begin{bmatrix} 0.9 & 0.1 & 0 & 0 \\ 0 & 0.9 & 0.1 & 0 \\ 0 & 0 & 0.9 & 0.1 \\ 0.1 & 0 & 0 & 0.9 \end{bmatrix}$$

$$\nwarrow \quad \swarrow \quad \searrow \quad \nearrow$$

$$B = \begin{bmatrix} 0.95 & 0.02 & 0.01 & 0.02 \\ 0.02 & 0.95 & 0.02 & 0.01 \\ 0.01 & 0.02 & 0.95 & 0.02 \\ 0.02 & 0.01 & 0.02 & 0.95 \end{bmatrix}$$

$$\pi = 0.25 * \begin{bmatrix} 1 \\ 1 \\ 1 \\ 1 \end{bmatrix}$$

With respect to the example using a circular gesture, when the hand is moved counter-clockwise starting on the positive x-axis with phase φ=0, after a few samples from the sensor, the state s1 will be the most likely one in the given HMM, as the dominant direction of the circle movement within the first quadrant of the coordinate system in FIG. 6 is towards the top left, and the corresponding direction vector is most likely produced when the HMM is in state s1: The maximum in the first column of matrix B—which corresponds to the top-left direction vector—is in row 1 corresponding to state s1. As the hand continues the counter-clockwise movement, the most likely state will proceed to be s2, s3, s4, s1, and so on.

Hence, knowing that a counter-clockwise circle is executed by hand movement, and knowing the maximum likely state in the corresponding HMM, we can deduce in about 'where', i.e. at what phase in the circle the hand is currently moving—without needing to know the drawn circle's absolute position in space.

General Description:

Assume we are given a finite-state machine (FSM) with N states. We are also given a feature space, i.e. a set of features that can be selected or extracted from the measurement data provided by a sensor sampling a continuous-time pattern at discrete-time instances. Each state of the FSM is assumed to produce the features (or observations) in the feature set with a certain probability, i.e. each state is assigned to an observation probability distribution. In the simplest case, each state maps to a single feature of the feature set with probability 1. These distributions are commonly stored in a so-called observation matrix B. The FSM is representing a particular pattern or a set of particular patterns.

Based on this observation probability distribution, we assign a Sequence Progress Level (SPL) in the continuous-time pattern to each state (a priori), in increasing order according to the sequence's progress. Without loss of generality we set the value range for the SPLs to [0,N]. Example: FIG. 6 shows the N=4 SPLs q1=Q(1)=0.5, q2=Q(2)=1.5, q3=Q(3)=2.5 and q4=Q(4)=3.5, assigned to states s1, s2, s3 and s4, respectively, for the introductory example. The motivation to do so is as follows: Assume the SPLs in the range of [0,N] are distributed over the full circle pattern in a monotonous manner, starting on the positive x-axis with q=0 over the positive y-axis with q=1, negative x-axis with q=2, negative y-axis with q=3, and back to the positive x-axis with q=4. Q(1) to Q(4) are placed at the positions of the pattern which match the dominant observation of their corresponding states s1 to s4.

On run-time, given the FSM and the features extracted from the sensor data, a state probability distribution is computed for the states of the FSM, and is updated for each new sensor sample. At each discrete-time instance, the simplest way to obtain an SPL estimate is to select the state with the maximum probability in this distribution and output the SPL assigned to this state. Another, more sophisticated approach is shown in Listing 1 below.

The HMM for a clock wise circle detection uses a similar state model as shown in FIG. 8 with clock wise transitions (arrows pointing in opposite directions as shown in FIG. 8). With tracking of filter state probabilities, for example, when the most likely state is primarily associated with the top left direction vector (dominant probability for the top left direction vector in matrix B), it can be assumed that $\varphi=45°$. The transition to the next state corresponds to roughly 90° change in angle. The accumulated number of state transitions can then be output.

Figure 9:
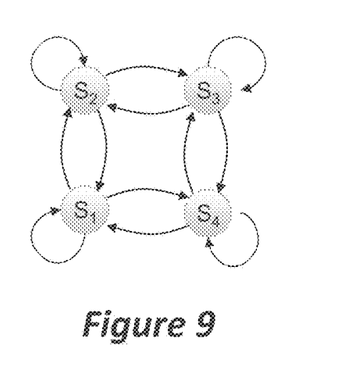

FIG. 9 shows another embodiment providing for a bidirectional circular HMM for both clockwise and counterclockwise gesture detection. This model can be used to potentially replacing two existing, single-direction circle HMMs, one for clockwise circle and one for counterclockwise circle, which may lead to flash memory savings for an actual embodiment.

Figure 11:
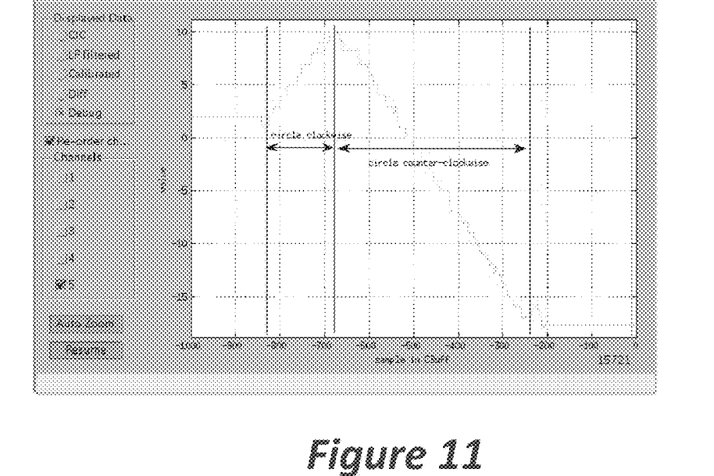
FIGS. 11 and 12 show a plurality of output values generated by a method according to various embodiments.

Additional filter(s) for smoothening the stair-case shape output as in FIG. 11 may be necessary. The model can be furthermore modified to include a stopping criteria to allow forward/backward scrolling, for example by including an extended time-out in a virtual scroll wheel (VSW) mode when a finger is not moving. According to other embodiments, the number of states can be increased for finer granularity and is not limited to the examples using four states.

The rule for computing the state probability distribution on run-time can be the Maximum Likelihood (ML) or the Maximum A posteriori Probability (MAP) rule to compute the most likely state or the most likely state sequence.

Each state is assigned a state index i and an SPL $Q(i)$.

a) Self-designed FSM: For a predefined continuous pattern (or 'sequence'), each state of the FSM is assigned to a certain discrete-time instance (SPL) in this continuous-time pattern, such that the state indices are in the same order or in opposite order as the corresponding SPLs appear in the continuous pattern represented by this FSM. Each SPL is located within one of N adjacent sequence segments, preferably in the segment centers. Then, for each state, the observation probability distribution is chosen such that it resembles the observations typically obtained when the sensor is sampling the continuous-time pattern in this segment.

Example: The introductory example is such a self-designed FSM, more precisely a first order circular Hidden Markov Model with N=4 states. FIG. 6 shows the sequence segments (four circle quarters, one in each quadrant) around the four SPLs q1, q2, q3 and q4. The state transition matrix A in Table 1 reflects the model's circular structure: As mentioned above, transitions with non-zero probability only occur from a state to itself or the one with the next higher index, and from the fourth state s4 back to s1. For each state, the observation matrix B has a dominant, i.e. most probable observation, corresponding to the dominant movement direction in the segment.

b) Pre-defined FSM (e.g. trained HMM): Given a FSM with an observation probability distribution assigned to each of its states, for a predefined continuous pattern (or 'sequence'), a typical SPL $Q(i)$ within the continuous-time pattern is to be identified for each state si such that the indices are in the same order (or in opposite order) in which the corresponding SPLs appear in the continuous-time pattern.

Example: Given a set of observations and the matrix B containing the probability distribution over the observations for each state, compute an average or expected observation (e.g. arithmetic mean) for each state. Given a reference pattern with assigned SPLs, e.g. the SPLs being uniformly distributed over the typical temporal duration of this pattern, for each state identify the SPL in the pattern where its expected observation fits and assign this SPL to the state. Given the observation probability matrix B in Table 2, which shows another exemplary set of matrices A and B, and the associated direction arrows corresponding the SPLs 0.5, 1.5, 2.5 and 3.5, the computation of the expected observation (distribution's mean value, or weighted sum) while considering the models cyclic structure would work for the second state s2 as follows: We search the maximum in row 2 corresponding to state s2 in matrix B, yielding $B(2,4)=0.9$ for the direction vector to the top right in column 4. This probability is weighting the SPL $q=3.5$ corresponding to this observation. Accordingly, the probability $B(2,3)$ in column 3 is weighting the SPL $q=2.5$. Due to the model's cyclic structure and the resulting computation of SPLs modulo N, for each observation it needs to be decided if it is to be considered occurring before the most likely observation(s) or thereafter. As the maximum probability is in column 4, the SPL of the observation cyclically to its right in column 1 is $q=0.5+(N=4)=4.5$ and the corresponding probability is $B(2,1)=0.05$. Because the probability $B(2,1)=0.05$ in column 1 cyclically to the right of the maximum $B(2,4)=0.9$ in column 4 is larger than the probability $B(2,3)=0.04$ to the left of the maximum, column 2 is also considered to be cyclically to the right of column four, yielding the SPL $q=5.5$. Thus, the weighted sum of SPLs becomes:

$$\begin{aligned} SPL(s2) &= Q(2) \\ &= B(2,1)^*4.5 + B(2,2)^*5.5 + B(2,3)^*2.5 + B(2,4)^*3.5 \\ &= 0.05^*4.5 + 0.01^*5.5 + 0.04^*2.5 + 0.9^*3.5 \\ &= 3.53 \end{aligned}$$

Would this result be greater than N or smaller than 0, we would need to compute modulo N. Different approaches for assigning the SPL to a state are also possible, e.g. ignoring the direction vector which faces the opposite direction of the direction vector with maximum probability.

TABLE 2

$$A = \begin{bmatrix} 0.9 & 0.05 & 0 & 0.05 \\ 0.05 & 0.9 & 0.05 & 0 \\ 0 & 0.05 & 0.9 & 0.05 \\ 0.05 & 0 & 0.05 & 0.9 \end{bmatrix}$$

$$\nwarrow \quad \swarrow \quad \searrow \quad \nearrow$$

$$B = \begin{bmatrix} 0.01 & 0.05 & 0.85 & 0.09 \\ 0.05 & 0.01 & 0.04 & 0.9 \\ 0.91 & 0.03 & 0.02 & 0.04 \\ 0.06 & 0.89 & 0.04 & 0.01 \end{bmatrix}$$

Figure 10:
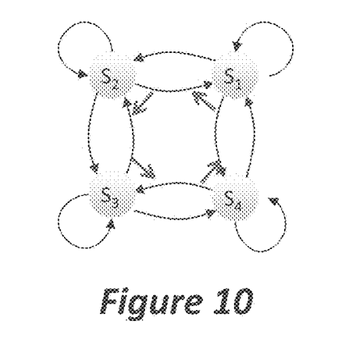
Figure 12:
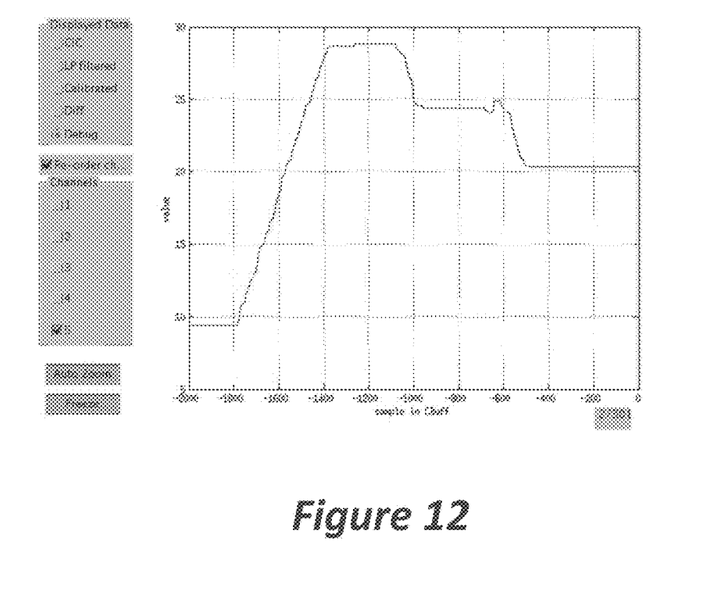

According to the embodiment shown in Table 2, the state transition probability matrix A is set for a bi-directional circular HMM to generate the screenshots shown in FIG. 11 and FIG. 12. FIG. 10 shows the associated state diagram of the bi-directional circular HMM. FIG. 11 visualizes an example of the system's output level for a gesture divided into three continuous sections. The first section shows no activity followed by a clockwise circle gesture activating the VSW mode. The steps indicate the associated increasing scroll parameter, or the transitions between two or more states, respectively. After a certain clockwise circle time, the user immediately continues to make a counter-clock wise gesture which decreases the associated parameter as shown in FIG. 11.

The stopping criterion, i.e. the decision rule for detecting the end of the continuous-time pattern, may need to be adapted such that it does not detect a stop when the pattern is hardly changing for some shorter amount of time.

As mentioned above, according to other embodiments, the granularity of the progress levels can be improved (i.e. the steps between two consecutive levels can be made smaller) by increasing the number of levels, i.e. by increasing the number of states.

According to further embodiment, post-processing can be applied to smoothen the transition between two levels, i.e. the rule of selecting the state with highest probability can be replaced by more sophisticated rules. Let q denote the SPL estimate to be computed by our algorithm. Without any loss of generality let the value range of q be q \in [0,N], where N is the number of states in the HMM under consideration. Let Q=[Q(1) Q(2) ... Q(N)] denote the a vector containing the SPL for each state, where holds Q(i)<=Q(i+1) for all i=1, 2, ..., N-1, and Q(i) having the same value range as q. The first step for smoothening is to exploit the internal smoothening of the state probability propagation: Instead of selecting the state with maximum probability, we compute a mean SPL using the probabilities of all states, denoting the (forward) probability of state si by alpha(i). A second proposal for smoothening the state transition is to introduce a memory factor theta \in [0,1] in order to gradually update the SPL estimate q. We differentiate between sequences/patterns with a distinct start and stop (non-periodic), and periodic sequences like circles in the context of gesture recognition (periodic). Let q(k) denote q at discrete time instance k.

a) Non-periodic: q(k+1)=theta*q(k)+(1-theta)*sum_{i=1} {N} alpha(i)*Q(i)

b) Periodic: The range of q now is q \ in [0,N]. Due to the periodicity of the HMM a weighted sum as in the non-periodic case is not possible. Instead, a differential update approach is made in order to avoid overflow/underflow problems when, for example, a state transition from a state with high SPL to a state with low SPL takes place. An update of the SPL estimate q is allowed only by amounts less than N/2.

Listing 1

```
// Update of the SPL Estimate on Run-Time (cyclic model)
// ---------------------------------------------------------
// Δq: Differential SPL update value
// N: Number of states in the state machine
// q: Latest SPL estimate
// Q(i): SPL assigned to state si
// alpha(i): Probability of state si
// theta: Memory factor (for smoothening of output)
Δq=0;              // re-initialize differential update value
```

-continued

Listing 1

```
// Loop over all states to gather contribution for updating q
FOR i=1:N {
    // Compute difference of current state's SPL Q(i) relative to latest SPL
    // estimate q while considering cyclic overflow/underflow
    h=Q(i)-q;
    IF |h|>N/2 {
        IF h>0 {
            h=h-N;
        }
        ELSE {
            h=h+N;
        }
    }
    // Add contribution of current state to the differential SPL update value
    Δq=Δq+h*alpha(i);
}
q=q+theta*Δq;
q=mod(q,N)
```

Listing 1 displays an exemplary update rule which is applied at each discrete time step after measurement data is acquired and the HMM forward probabilities are computed. FIGS. 11 and 12 show the tracking of (counter-) clockwise circles using a bi-directional circular HMM with the state transition probability matrix in Table 2, where the SPL assignment is as in FIG. 6. Clockwise circle movement increases the level of the signal in the figures, counter-clockwise circles decrease the signal level. FIG. 12, thus, visualizes, implementation with smoothening post-processing. First, several clockwise circles are performed to increase the scroll parameter shown in the graph, then follows a pause, and then a few counter-clockwise circles, pause, few more counter-clockwise circles. The bi-directional circular HMM in Table 2 has been used for this example. In FIG. 12 there are also segments in the plotted signal where the signal level is approximately constant, which is during movement pauses. Compared to FIG. 11, the stair-case characteristic of the signal is reduced significantly due to smoothening.

Smoothening can also be achieved by modifying the MINI model parameters in the matrices A and/or B according to other embodiments.

Summary of Some of the Features

According to an embodiment, the state with the maximum probability may not necessarily be selected, but an 'interpolated' state index and the corresponding SPL can be computed by taking the mean value of the state probability distribution.

One or more of the following features may be implemented according to various embodiments:

The FSM may have finite memory. The FSM may fulfill the Markov property, i.e. the FSM can be a 1st order Markov Model. The most likely state can be computed using the Forward (Baum-Welch) Algorithm. The most likely state and/or the most likely state sequence can be computed using the Viterbi Algorithm. The states of the Markov Model are hidden, i.e. the FSM is a Hidden Markov Model (HMM). The FSM can be a Hidden Markov Model which is used in a conventional, event-based pattern recognition system where from a set of HMMs the most likely one given a continuous-time pattern or its corresponding discrete-time sequence of observations is determined, and the observation sequence is the sequence of features obtained from a sensor between a given start time instance and a given stop time instance.

1. When a pre-defined condition is met for the MINI being prepared for SPL tracking, then it may be switched from conventional event based pattern recognition mode to SPL tracking mode.

2. This condition is to exceed a pre-defined probability.

3. The criteria for stop detection during conventional, event-based pattern recognition may differ from the ones applied during SPL tracking mode.

The continuous-time pattern can be a gesture, wherein a gesture is defined as a pre-defined movement pattern. For example, the continuous-time pattern can be a circle gesture. However, as mentioned above, other types of gestures, even gestures of the non-circular type can be used, or even non-gesture patterns. The MINI can be a linear HMM or a circular HMM. The MINI can be a bi-directional HMM. SPL tracking can then be performed also in the pattern's opposite direction, i.e. forward and backward.

Application of the Detection Method

The circular gesture resembles the control of a rotary knob and therefore can be preferably used, for example, as a virtual Volume control wheel, for example, of a HiFi set: Clockwise movement increases the volume, counter-clockwise movement decreases the volume. However, any other rotary knob function can be implemented according to various embodiments.

Figure 13:
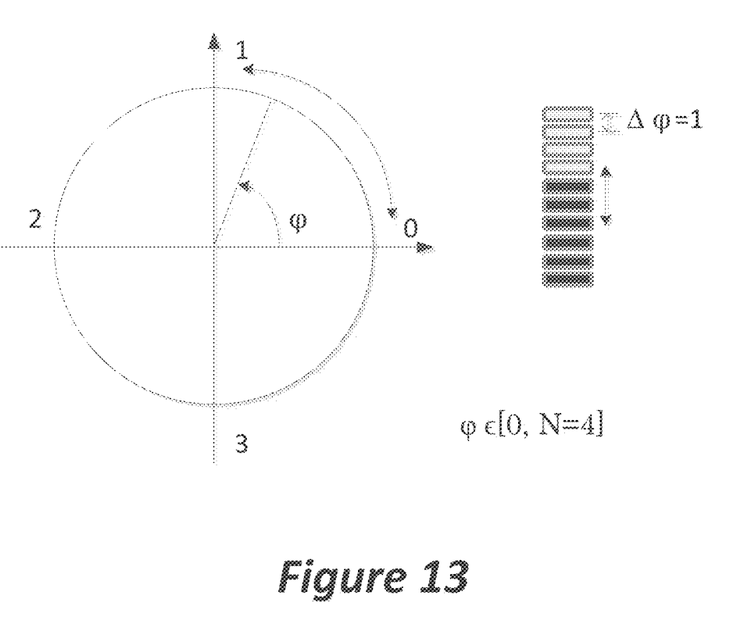
FIG. 13 shows an exemplary application with a bar graph level meter whose level is differentially updated upon detection of a circular gesture.

FIG. 13 shows an exemplary design using a vertical bar graph indicating a respective level corresponding to the SPL of a clockwise/counter-clockwise circle gesture, i.e. the graph's level is increased/decreased by one bar when the SPL has increased/decreased by a certain amount (e.g. after each quarter of a circle). FIG. 13 shows an application that may be used as a volume control wheel with a phase indicator, and an LED display where the height of the bar of lightened LEDs indicates the volume. Zero lightened LEDs corresponds to mute, all LEDs lightened corresponds to maximum volume. Turning the volume wheel increases/decreases the volume, and when the wheel has been turned by a defined amount, e.g. by 90 degrees (corresponding to $\Delta\varphi=1$), one LED is lightened or turned off. While the volume wheel can theoretically be turned by an infinite amount, the LED bar graph saturates at mute or maximum volume. As mentioned above, any other type of rotary knob function may apply.

For example, but not limiting, other applications may include:

Any media-player control type functionality known from circular touchpad.

Control a dimmer in a light switch

Replacement for a PC mouse's scroll wheel

Types of sensor systems/measurement input devices (examples)

1. 1D slider functions, or other one-dimensional gestures;
2. 2D Touch panels/touch displays, 2D video cameras
3. 3D video cameras, 3D capacitive sensor systems Internal usage of the SPL information within the pattern recognition system to increase recognition robustness.

Other Modes

Provided a 1D, 2D or 3D positioning system (e.g. camera based, or capacitive sensor system), it is also possible to evaluate partial patterns (e.g. a partially drawn circle) using, for example, image processing techniques. However, this would require additional algorithmic machinery (scaling, rotation, new distance measures) and thus is not as easily integrated into an existing HMM-based pattern recognition system as the proposed method. Remark: Using camera based sensor systems together with SPL tracking may be considered as a preferred method.

Partial Patterns could also be detected using partial HMMs. However, then the gesture recognition algorithms would need to be run for each partial HMM which infers significant increase in computational complexity.

Extensions

The bi-directional circle HMM can also be used to replace the two HMMs for clockwise and counter-clockwise circles: The decision between clockwise or counter-clockwise movement can be done in a post-processing stage where the accumulated differential SPL after gesture stop detection is checked for its sign.

The input of observations (direction vectors) into the HMM pattern recognition algorithms can be limited to time instances when there is movement detected. This way, for example, when drawing a clockwise circle, pausing, and drawing a counter-clockwise circle, no observations are input in the movement pause, where the direction vectors are only dependent on noise, but not on the actual movement information.

REFERENCES

R. Aubauer et al. (DE 10 2010 007 455 A1 2011.08.11): "System und Verfahren zum beruehrungslosen Erfassen und Erkennen von Gesten in einem dreidimensionalem Raum"

A. Heim et al.: "Automatic Gesture Recognition for a Sensor System", MTI #3654

What is claimed is:

1. A method for state tracking based gesture recognition engine for a sensor system comprising the steps of:
    defining a plurality of sequential states of a finite-state machine, wherein the finite state machine is an N-state Hidden Markov Model (HMM) comprising a state transition probability matrix,
    determining a Sequence Progress Level (SPL) for each state,
    mapping a state probability distribution to an SPL on run-time, and
    utilizing the mapped SPL estimate as an output value of the sensor system, wherein a most likely state and/or a most likely state sequence is computed using a Viterbi Algorithm,
    wherein for each discrete-time instance the data provided by the sensor system is forwarded to the finite state machine which computes a state probability distribution for the N-state HMM, and wherein, for each discrete-time instance, a state with the maximum probability is selected and an SPL associated with the state is output.

2. The method according to claim 1, wherein a last state is followed by a first state of the plurality of sequential states.

3. The method according to claim 1, wherein the sensor system is a three-dimensional (3-D) sensing system.

4. The method according to claim 3, wherein the 3-D sensor system is a near-field capacitive sensor systems or a mid/far field sensor system.

5. The method according to claim 4, wherein the mid/far field sensor system uses a video or infrared camera system.

6. The method according to claim 4, wherein the near-field capacitive sensor system is a capacitive non-touching 3-D sensor system based on a quasi static electric field measurements.

7. The method according to claim 1, wherein the sensor system is a two-dimensional (2-D) sensing system, a capacitive or resistive touch system or a touchscreen system.

8. The method according to claim 1, wherein the sensor system is a one-dimensional (1-D) sensing system.

9. The method according to claim 1, wherein the plurality of states are states of a circular gesture.

10. The method according to claim 1, wherein the state transition probability matrix comprises in each row a maximum probability value.

11. The method according to claim 10, wherein all probabilities of each row add up to 100%.

12. The method according to claim 1, wherein the HMM further uses an observation matrix which indicates the probability of predefined movement directions.

13. The method according to claim 12, wherein the observation matrix comprises in each row a maximum probability value.

14. The method according to claim 13, wherein all probabilities of each row add up to 100%.

15. The method according to claim 1, wherein for each time instance an SPL is computed from the state probability distribution and is output.

16. The method according to claim 1, wherein the method distinguishes between a clock-wise circular gesture, a counter-clockwise circular gesture, or a no-movement gesture.

17. The method according to claim 1, wherein a Maximum Likelihood rule is applied to compute the most likely state.

18. The method according to claim 12, wherein, for a plurality of sequential output values a smoothening algorithm is applied during post processing of sequential output values.

19. A method for gesture recognition comprising the method according to claim 1, further comprising a pattern based gesture recognition mode, wherein the method switches between the pattern based gesture recognition mode and a state tracking based gesture recognition mode provided by the state tracking based gesture recognition engine when a predefined condition is met.

20. The method according to claim 19, wherein each state is assigned to an observation probability distribution.

21. The method according to claim 19, wherein during the state tracking based gesture recognition mode for each discrete-time instance the data provided by the sensor system is pre-processed and forwarded to the finite state machine which computes a state probability distribution for each state of the N-state HMM.

22. The method according to claim 21, wherein for each time instance a SPL is computed from the state probability distribution and is output.

23. The method according to claim 21, wherein the state tracking based gesture recognition mode distinguishes between a clock-wise circular gesture, a counter-clockwise circular gesture, or a no-movement gesture.

24. The method according to claim 23, wherein the method switches back to the pattern based gesture recognition mode if a predefined time threshold for a no-movement gesture is met.

25. The method according to claim 21, wherein a Maximum Likelihood rule is applied to compute the most likely state.

26. The method according to claim 21, wherein, for a plurality of sequential output values a smoothening algorithm is applied during post processing of sequential output values.

27. The method according to claim 22, wherein, for a plurality of sequential output values a smoothening algorithm is applied during post processing of sequential output values.

28. A method of operating a device configured to implement the method according to claim 1, wherein the output value is used to control a function of the device.

29. The method according to claim 28, wherein the function is increasing or decreasing a volume level, controlling a dimmer, or controlling a scroll function.

* * * * *